(12) United States Patent
Cole (10) Patent No.: US 9,862,050 B2
(45) Date of Patent: Jan. 9, 2018

(54) AUTO STEERING IN A WELD JOINT

(71) Applicant: LINCOLN GLOBAL, INC., City of Industry, CA (US)

(72) Inventor: Stephen Cole, Chula Vista, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1201 days.

(21) Appl. No.: 13/792,416

(22) Filed: Mar. 11, 2013

(65) Prior Publication Data

US 2013/0256287 A1    Oct. 3, 2013

Related U.S. Application Data

(63) Continuation-in-part of application No. 13/438,703, filed on Apr. 3, 2012.

(51) Int. Cl.
  *B23K 9/10*    (2006.01)
  *B23K 9/02*    (2006.01)
  (Continued)

(52) U.S. Cl.
  CPC .............. *B23K 9/10* (2013.01); *B23K 9/0216* (2013.01); *B23K 9/0953* (2013.01); *B23K 9/0956* (2013.01); *B23K 9/1278* (2013.01)

(58) Field of Classification Search
  CPC .......... B23K 9/10; B23K 9/08; B23K 9/1037; B23K 9/0953; B23K 9/0956; B23K 9/287; B23K 9/0737; B23K 9/095; B23K 9/1226
  (Continued)

(56) References Cited

U.S. PATENT DOCUMENTS 1,740,381 A * 12/1929 Weed .................... B23K 9/0035
                                                                    219/123
1,792,243 A *  2/1931 Richter ................ B23K 9/0737
                                                                    219/123
(Continued)

FOREIGN PATENT DOCUMENTS

CN           101032778 A       9/2007
CN           102133679 A       7/2011
(Continued)

OTHER PUBLICATIONS

International Application No. PCT/IB2013/000583, International Search Report & Written Opinion, 9 pages, dated Sep. 20, 2013.
(Continued)

*Primary Examiner* — David Angwin
*Assistant Examiner* — Jimmy Chou
(74) *Attorney, Agent, or Firm* — Perkins Coie LLP (57) ABSTRACT

A method of and system for steering an arc and/or torch head in a weld joint is provided. The system includes a torch head that creates an arc in a weld groove formed in at least one workpiece. The system also includes a control unit that includes a feedback system that monitors at least one of a voltage of the arc, a current of the arc, a power output of the torch power supply, and a contact tip to weld distance. The control unit outputs a feedback signal corresponding to the monitoring. The control unit also includes a comparison circuit that compares the feedback signal with at least one predetermined value corresponding to a position of at least one of the arc and the torch head in the weld groove. The control unit further includes an arc steering system that outputs a steering signal based on the comparison.

11 Claims, 7 Drawing Sheets

(51) Int. Cl.
    *B23K 9/095* (2006.01)
    *B23K 9/127* (2006.01)

(58) Field of Classification Search
    USPC .............. 219/130.31, 130.4, 122, 123, 124.1,
    219/124.34, 124.32, 124.33
    See application file for complete search history.

(56) References Cited

U.S. PATENT DOCUMENTS

| | | | | |
|---|---|---|---|---|
| 1,854,536 A * | 4/1932 | Wilson | ................ | B23K 9/0737 |
| | | | | 219/123 |
| 2,694,129 A * | 11/1954 | Yenni | ................... | B23K 9/0737 |
| | | | | 219/123 |
| 2,702,846 A * | 2/1955 | Breymeier | ........... | B23K 9/0737 |
| | | | | 219/123 |
| 2,743,342 A * | 4/1956 | Bettis | ...................... | B23K 9/08 |
| | | | | 219/123 |
| 2,756,311 A | 7/1956 | Persson et al. | | |
| 2,773,969 A * | 12/1956 | Gunther | ................ | B23K 9/145 |
| | | | | 219/123 |
| 2,820,183 A * | 1/1958 | Ander | ................ | H01H 51/2272 |
| | | | | 335/232 |
| 2,844,705 A * | 7/1958 | Bowman | .............. | B23K 9/0253 |
| | | | | 219/123 |
| 2,920,183 A * | 1/1960 | Greene | ................ | B23K 9/0737 |
| | | | | 219/123 |
| 2,994,763 A * | 8/1961 | Schultz | ................ | B23K 9/0737 |
| | | | | 219/123 |
| 3,102,946 A * | 9/1963 | Fonberg | ................... | H05H 1/40 |
| | | | | 219/123 |
| 3,174,027 A | 3/1965 | Manz | | |
| 3,274,371 A | 9/1966 | Manz et al. | | |
| 3,433,924 A | 3/1969 | Sevenco | | |
| 3,483,354 A * | 12/1969 | Saenger John, Jr. | .. | B23K 9/167 |
| | | | | 219/137 PS |
| 3,551,637 A * | 12/1970 | Lampson | ............. | B23K 9/0737 |
| | | | | 219/123 |
| 3,602,683 A * | 8/1971 | Hishida | ................. | B23K 10/02 |
| | | | | 219/121.36 |
| 3,626,145 A * | 12/1971 | Jackson | ............... | B23K 9/0737 |
| | | | | 219/123 |
| 3,627,974 A | 12/1971 | Normando et al. | | |
| 3,825,712 A * | 7/1974 | Gibbs | ....................... | B23K 9/08 |
| | | | | 219/123 |
| 3,851,139 A | 11/1974 | Rudd | | |
| 3,885,123 A * | 5/1975 | Sciaky | .................... | B23K 9/08 |
| | | | | 219/123 |
| 3,956,610 A * | 5/1976 | Kanbe | ................... | B23K 9/0216 |
| | | | | 219/130.51 |
| 3,978,311 A * | 8/1976 | Toth | ........................ | G01R 15/22 |
| | | | | 219/136 |
| 4,019,011 A * | 4/1977 | Cape | ..................... | B23K 9/048 |
| | | | | 219/123 |
| 4,027,135 A * | 5/1977 | Barger | .................... | B23K 9/04 |
| | | | | 219/123 |
| 4,048,436 A | 9/1977 | Hiratake et al. | | |
| 4,095,077 A | 6/1978 | Schneider et al. | | |
| 4,095,085 A * | 6/1978 | Tomita | .................... | B23K 9/30 |
| | | | | 219/123 |
| 4,145,593 A | 3/1979 | Merrick et al. | | |
| 4,169,962 A * | 10/1979 | Hiratake | ................. | B23K 10/00 |
| | | | | 373/18 |
| 4,190,760 A * | 2/1980 | Kano | ......................... | H01F 5/00 |
| | | | | 219/123 |
| 4,194,106 A * | 3/1980 | Rudaz | .................... | B23K 9/0737 |
| | | | | 219/123 |
| 4,215,299 A * | 7/1980 | Edwin | ..................... | B23Q 35/127 |
| | | | | 219/124.34 |
| 4,301,355 A | 11/1981 | Kimbrough et al. | | |
| 4,326,155 A * | 4/1982 | Griebeler | ............. | B23Q 35/127 |
| | | | | 219/124.34 |
| 4,336,441 A * | 6/1982 | Godai | ..................... | B23K 9/23 |
| | | | | 219/123 |
| 4,366,362 A * | 12/1982 | Ohta | ..................... | B23K 9/167 |
| | | | | 219/123 |
| 4,409,465 A * | 10/1983 | Yamamoto | ............. | B23K 9/091 |
| | | | | 219/130.31 |
| 4,417,126 A * | 11/1983 | Kasahara | ............... | B23K 9/127 |
| | | | | 219/124.22 |
| 4,456,814 A | 6/1984 | Mizuno et al. | | |
| 4,485,292 A | 11/1984 | Mizuno et al. | | |
| 4,507,541 A * | 3/1985 | Fourre | .................... | B23K 9/127 |
| | | | | 219/124.03 |
| 4,511,784 A | 4/1985 | Miyamori et al. | | |
| 4,547,654 A | 10/1985 | Stol | | |
| 4,580,026 A | 4/1986 | Stol | | |
| 4,614,856 A | 9/1986 | Hori et al. | | |
| 4,628,182 A * | 12/1986 | Hori | ....................... | B23K 9/124 |
| | | | | 219/130.33 |
| 4,714,818 A * | 12/1987 | Mazac | .................... | B23K 9/08 |
| | | | | 219/123 |
| 4,806,735 A * | 2/1989 | Ditschun | ............... | B23K 9/1735 |
| | | | | 219/130.31 |
| 4,904,843 A * | 2/1990 | Hori | ....................... | B23K 9/1093 |
| | | | | 219/130.51 |
| 4,975,558 A * | 12/1990 | Lukens | .................... | B23K 9/08 |
| | | | | 219/123 |
| 4,990,743 A * | 2/1991 | Kugai | ................... | B23Q 35/129 |
| | | | | 219/124.34 |
| 5,040,125 A * | 8/1991 | Okumura | ............... | B23K 9/0956 |
| | | | | 219/124.34 |
| 5,043,554 A | 8/1991 | Kohsaka et al. | | |
| 5,130,514 A * | 7/1992 | Kugai | ................... | B23Q 35/129 |
| | | | | 219/124.34 |
| 5,171,966 A * | 12/1992 | Fukuoka | ............... | B23K 9/0216 |
| | | | | 219/124.34 |
| 5,206,474 A * | 4/1993 | Fukuoka | ............... | B23K 9/127 |
| | | | | 219/124.34 |
| 5,233,158 A * | 8/1993 | Karakama | ............ | B23K 9/0956 |
| | | | | 219/130.33 |
| 5,406,052 A | 4/1995 | Mizuno et al. | | |
| 5,473,139 A | 12/1995 | Matsui et al. | | |
| 5,508,493 A | 4/1996 | Ueyama et al. | | |
| 5,932,121 A | 8/1999 | Manabe et al. | | |
| 6,023,043 A * | 2/2000 | Manabe | ................... | B23K 9/08 |
| | | | | 219/123 |
| 6,037,554 A | 3/2000 | Innami et al. | | |
| 6,207,927 B1 | 3/2001 | Mita et al. | | |
| 6,331,694 B1 | 12/2001 | Blankenship | | |
| 6,335,511 B1 * | 1/2002 | Rothermel | ............. | B23K 9/091 |
| | | | | 219/124.03 |
| 6,337,455 B1 | 1/2002 | Yamaguchi | | |
| 6,617,547 B1 * | 9/2003 | Abdurachmanov | . | B23K 9/0737 |
| | | | | 219/123 |
| 6,621,049 B2 * | 9/2003 | Suzuki | ................. | B23K 9/0953 |
| | | | | 219/130.01 |
| 6,800,832 B2 * | 10/2004 | Hutchison | ............... | B23K 9/091 |
| | | | | 219/130.21 |
| 6,884,959 B2 | 4/2005 | Gandy et al. | | |
| 7,005,607 B2 * | 2/2006 | Takatani | ................ | B23K 9/022 |
| | | | | 219/124.34 |
| 7,041,937 B2 * | 5/2006 | Ihde | ....................... | B23K 9/173 |
| | | | | 219/137.71 |
| 9,044,817 B2 * | 6/2015 | Fukunaga | ............. | B23K 9/1735 |
| 2003/0024916 A1 * | 2/2003 | Wright | .................... | B23K 9/044 |
| | | | | 219/123 |
| 2004/0118826 A1 * | 6/2004 | Schmitt | ................... | B23K 9/08 |
| | | | | 219/123 |
| 2005/0199593 A1 | 9/2005 | Ignatchenko et al. | | |
| 2006/0237409 A1 | 10/2006 | Uecker et al. | | |
| 2007/0158324 A1 | 7/2007 | O'Donnell et al. | | |
| 2007/0210048 A1 | 9/2007 | Koshiishi et al. | | |
| 2007/0241087 A1 | 10/2007 | Peters | | |
| 2007/0262058 A1 * | 11/2007 | Ulrich | .................... | B23K 9/205 |
| | | | | 219/99 |
| 2008/0011727 A1 * | 1/2008 | Peters | .................... | B23K 9/025 |
| | | | | 219/130.5 |

(56) References Cited

U.S. PATENT DOCUMENTS

| | | | |
|---|---|---|---|
| 2008/0053978 A1* | 3/2008 | Peters | B23K 9/025 219/130.5 |
| 2008/0206594 A1 | 8/2008 | Fukuda et al. | |
| 2008/0230528 A1 | 9/2008 | Wilhelm | |
| 2009/0242533 A1 | 10/2009 | Yamazaki et al. | |
| 2010/0059485 A1 | 3/2010 | Hutchison et al. | |
| 2010/0096375 A1 | 4/2010 | Daniel et al. | |
| 2010/0213179 A1* | 8/2010 | Peters | B23K 26/0676 219/121.64 |
| 2011/0174784 A1 | 7/2011 | Kamei et al. | |
| 2011/0259853 A1 | 10/2011 | Yamazaki et al. | |
| 2011/0290771 A1* | 12/2011 | Fukunaga | B23K 9/126 219/130.1 |
| 2012/0312795 A1 | 12/2012 | Suzuki et al. | |
| 2013/0043219 A1 | 2/2013 | Peters et al. | |
| 2013/0112675 A1 | 5/2013 | Peters et al. | |
| 2013/0125685 A1 | 5/2013 | Miller et al. | |
| 2013/0228555 A1 | 9/2013 | Peters | |
| 2013/0256288 A1 | 10/2013 | Matthews et al. | |
| 2014/0001166 A1* | 1/2014 | Peters | B23K 9/0216 219/130.1 |
| 2014/0083987 A1 | 3/2014 | Dodge et al. | |
| 2015/0129560 A1 | 5/2015 | Muramatsu et al. | |
| 2015/0379894 A1* | 12/2015 | Becker | B23K 9/00 219/124.1 |

FOREIGN PATENT DOCUMENTS

| | | |
|---|---|---|
| CN | 102186618 A | 9/2011 |
| DE | 102007017225 A1 | 9/2008 |
| JP | 57-39077 A | 3/1982 |
| JP | 58-205680 A | 11/1983 |
| JP | 59-87981 A | 5/1984 |
| JP | 2-59179 A | 2/1990 |
| JP | 10-193116 A | 7/1998 |
| JP | 11-291038 A | 10/1999 |
| JP | 2011098375 A | 5/2011 |
| SU | 538842 A1 | 12/1976 |
| SU | 1637971 A1 | 3/1991 |

OTHER PUBLICATIONS

International Application No. PCT/IB2014/000283, International Search Report, 5 pages, dated Sep. 4, 2014.
International Application No. PCT/IB2014/000376, International Search Report & Written Opinion, 9 pages, dated Sep. 24, 2014.
International Application No. PCT/IB2014/000383, International Search Report & Written Opinion, 9 pages, dated Sep. 24, 2014.
U.S. Appl. No. 13/438,703, filed Apr. 3, 2012, Synchronized Magnetic Arc Steering and Welding.
U.S. Appl. No. 13/792,822, filed Mar. 11, 2013, Parallel State-Based Controller for a Welding Power Supply.
U.S. Appl. No. 13/834,485, filed Mar. 15, 2013, Tandem Hot-Wire Systems.
U.S. Appl. No. 13/834,179, filed Mar. 15, 2013, Tandem Hot-Wire Systems.
Schnick, et al. "Three-dimensional modeling of arc behavior and gas shield quality in tandem gas-metal arc welding using anti-phase pulse synchronization," Journal of Physics D: Applied Physics, 44 (2011) 185205, 11 pages.

* cited by examiner

AUTO STEERING IN A WELD JOINT

PRIORITY

The present application is a continuation-in-part of and claims priority to U.S. patent application Ser. No. 13/438,703, which is incorporated herein by reference in its entirety.

TECHNICAL FIELD

Certain embodiments relate to arc welding applications. More particularly, certain embodiments relate to steering an arc and/or torch in a weld joint in arc-welding/joining applications.

BACKGROUND

In related art arc welding systems such as gas-shielded tungsten arc welding (GTAW), gas-shielded metal arc welding (GMAW), plasma arc welding (PAW), etc., weld quality will be adversely affected if the torch head is not properly positioned with respect to the weld groove walls. For example, because ferrous materials of the weld-groove sidewalls can interfere with the arc, the arc of a torch head that is improperly positioned can shift to a sidewall rather than the bottom of the weld. Conversely, if the torch head is positioned too far away from the sidewall, the filler material will not be properly deposited against the sidewall. Further, even a torch head that has been properly positioned at the start of the welding process may need to be readjusted during the welding process. This is because the alignment of the sidewalls of the workpieces may not be straight and true and the relative position of the torch head with respect to the weld groove sidewall could change, i.e., the distance between the welding head and a groove sidewall could get smaller or larger, as the torch head travels the length of the weld groove. In addition, in some cases, the width of the weld groove could also vary along its length due to deviations in machining the weld groove. Accordingly, to account for misalignment and width variations in the weld groove, the position of the torch head and/or the width of the arc oscillation may need to be adjusted in situations where mechanical oscillation, magnetic oscillation and/or ground switching are used. Therefore, even in an "automated" welding process, an operator may need to watch the welding operation and constantly adjust the position of the torch head and/or the width of the arc oscillation.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a method and system for steering an arc and/or torch head in a weld joint in a system for arc-welding/joining applications. Some exemplary embodiments of the invention include an automated arc steering system that includes a feedback circuit that receives an indication of a position of an arc and/or torch head in a weld groove. The arc steering system also includes a comparison circuit that compares the arc and/or torch head position indication with a predetermined value. The predetermined value can be a desired voltage and/or current value for the arc and/or torch head for a given point in the weld groove. The arc steering system further includes an arc steering device that positions the arc and/or torch head based on the comparison the arc/torch head position indication with the predetermined value.

In some embodiments, the system includes a torch power supply that is operatively connected to a torch head that creates an arc in a weld groove formed in at least one workpiece. The system also includes a control unit that includes a feedback system that monitors at least one of a voltage of the arc, a current of the arc, a power output of the torch power supply, and a contact tip to weld distance. The control unit outputs a feedback signal corresponding to the monitoring. The control unit also includes a comparison circuit that compares the feedback signal with at least one predetermined value corresponding to a position of at least one of the arc and the torch head in the weld groove. The control unit further includes an arc steering system that outputs a steering signal based on the comparison. The steering signal is used to control the position of at least one of the arc and the torch head in the weld groove.

In some embodiments, the method includes creating an arc in a weld groove formed in at least one workpiece with a torch head. The method also includes monitoring at least one of a voltage of the arc, a current of the arc, a power output of the torch head, and a contact tip to weld distance, and outputting a feedback signal corresponding to the monitoring. The method further includes comparing the feedback signal with at least one predetermined value corresponding to a position of at least one of the arc and the torch head in the weld groove and outputting a steering signal based on the comparison. The method additionally includes controlling the position of at least one of the arc and the torch head in the weld groove based on the steering signal.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1A:
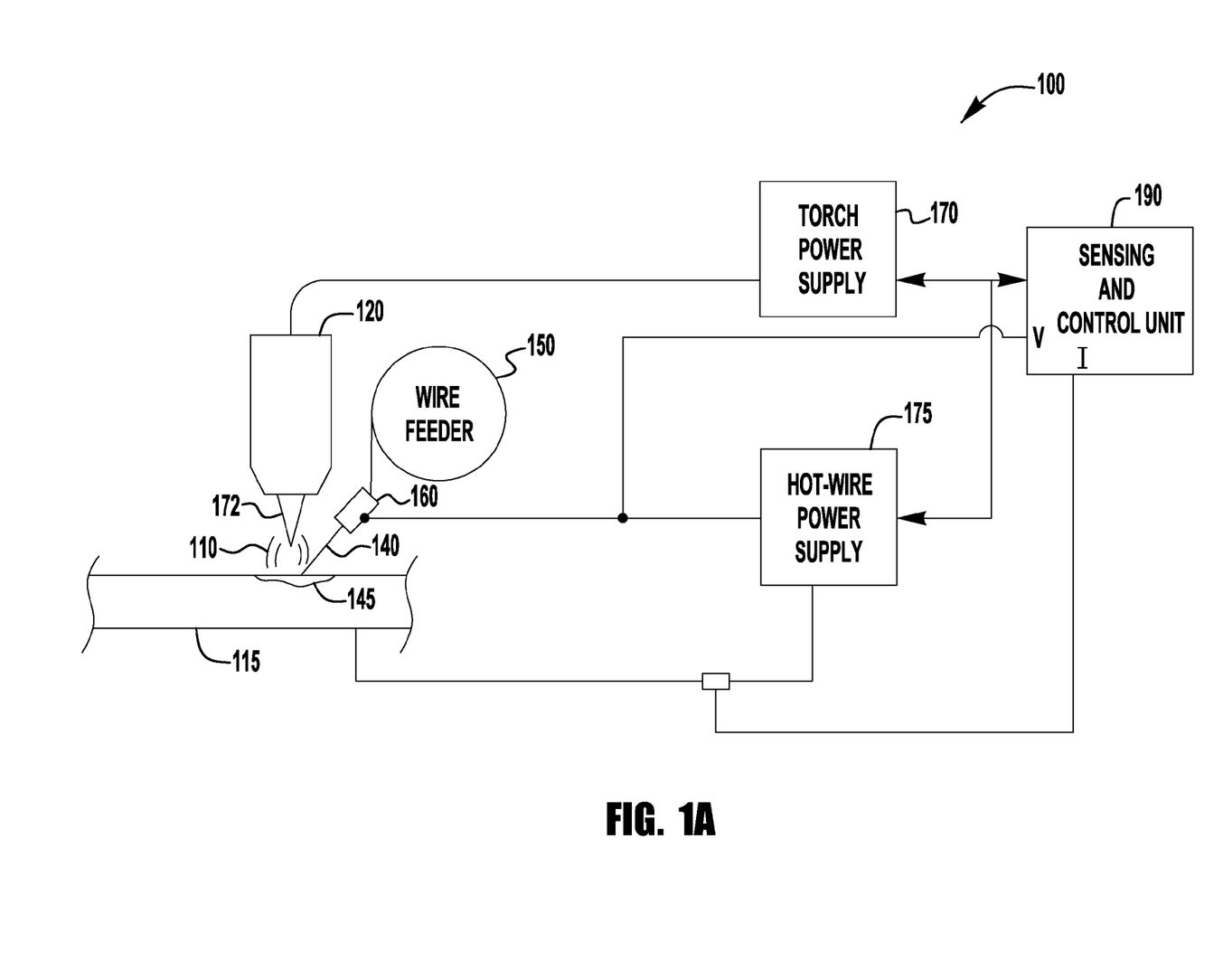
FIGS. 1A and 1B illustrate different views of a functional schematic block diagram of an exemplary embodiment of a system for any of brazing, cladding, building up, filling, hard-facing overlaying, joining, and welding applications.
Figure 1B:
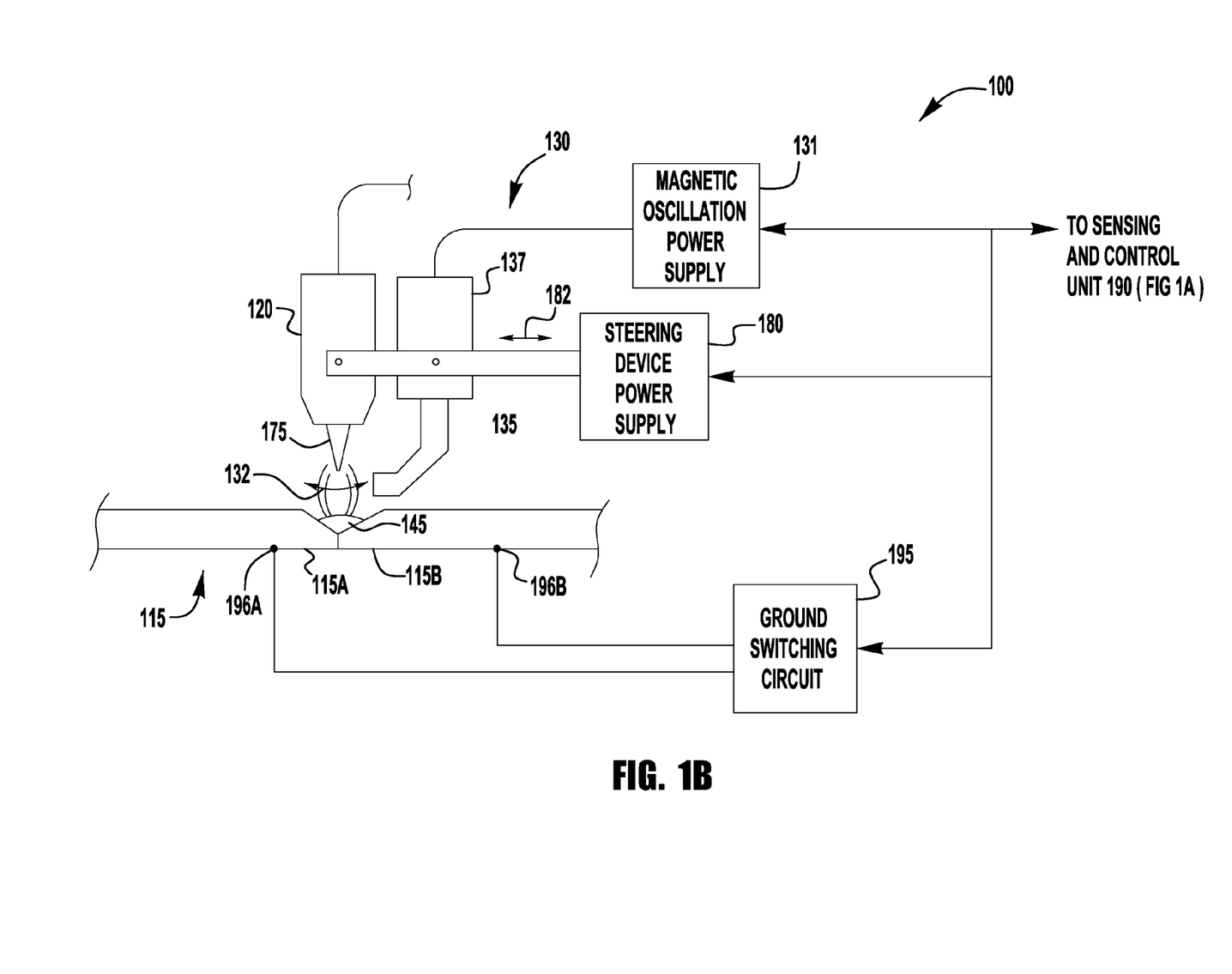
Figure 2A:
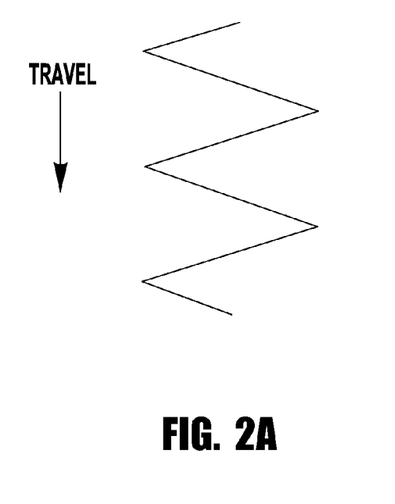
FIGS. 2A-2D illustrate exemplary oscillation patterns that can be produced by the system of FIGS. 1A and 1B.
Figure 2B:
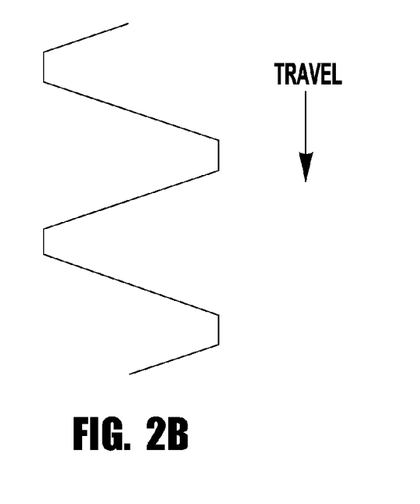
Figure 2C:
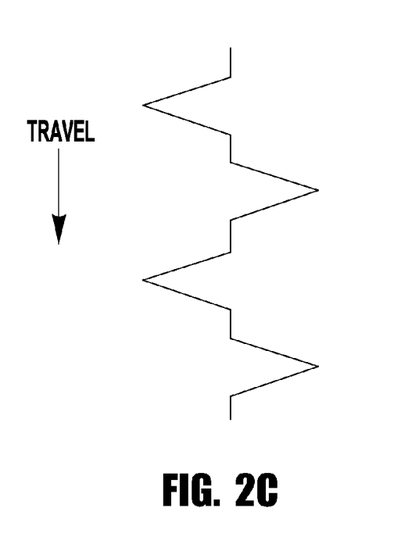
Figure 2D:
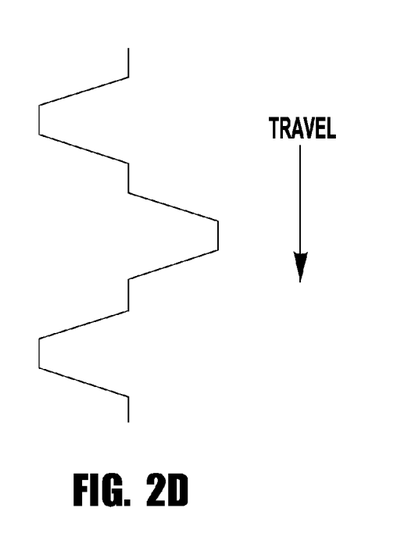

FIGS. 1A and 1B illustrate different views of an exemplary system 100 for welding/joining applications. For clarity, certain components are not shown in view. The system 100 includes an arc welding system such as a GTAW system. Although a GTAW system is illustrated, the present invention will work with any automated system that uses an arc for brazing, cladding, building up, filling, hard-facing overlaying, joining, and welding applications. As shown in FIG. 1A, the system 100 includes a power supply 170 that is operatively connected to tungsten electrode 172, which is housed in torch head 120. The power supply 170 can have an arc starter (not shown) that creates an arc 110 and/or the power supply 170 can be configured to "touch" start the arc 110. The power supply 170 provides a welding current to workpiece 115 via electrode 172 and arc 110. The arc 110 heats workpiece 115 to create a weld puddle 145. In some embodiments, the power supply 170 is a pulsed direct current (DC) power supply, although alternating current (AC) or other types of power supplies are possible as well. Generic arc welding is known and will not be discussed in detail.

As shown in FIG. 1B, the system 100 can also include a magnetic arc oscillation system 130. The magnetic arc oscillation system 130 includes a magnetic head 137, magnetic pole 135, and a power supply 131. The magnetic pole 135 can be set to have either a positive or negative polarity by head 137. The polarity on magnetic pole 135 determines where the arc 110 is directed, i.e., either toward the pole 135 or away from it. In some embodiments, the magnetic arc oscillator system 130 can also change the intensity of the magnetic field to control the amount of deflection of the arc 110. The magnetic arc oscillation system 130 can be configured to oscillate the arc 110 to produce a sweeping motion (an "arc sweep") as shown by arrow 132. The arc sweep 132 can be used to improve the weld-bead geometry by producing weaving patterns. For example, the magnetic arc oscillation system 130 can be used on wider weld passes such as the "cap" pass of a weld. This technique provides better sidewall fusion as the amount of heat to weld edges can be controlled. The magnetic arc oscillation system 130 can be used for fillet welds to minimize undercutting. In addition, when joining materials of different thicknesses, the arc oscillation can be controlled to adequately penetrate the thicker workpiece while preventing undercutting of the thinner workpiece. FIGS. 2A to 2D provide some exemplary arc sweep patterns that can be produced by the magnetic arc oscillation system 130. Of course, the present invention is not limited to the illustrated arc sweep patterns and any arc sweep pattern that produces the desired weld weave pattern can be used. In addition, magnetic arc oscillation methods and systems in combination with arc welding systems are disclosed in application Ser. No. 13/438,703, which is incorporated herein by reference, in its entirety. Accordingly, magnetic arc oscillation techniques will not be further discussed.

As illustrated in FIG. 1B, the system 100 can further include a mechanical steering device 180. The mechanical steering device 180 is operatively connected to torch head 120 via bracket 185. The bracket 185 can be controlled in order to steer the torch head 120 from one side of the weld groove to the other as shown by arrow 182. Of course, other steering methods and devices can be used so long as torch head 120 can be moved to the desired location within the weld groove. When used with the magnetic arc oscillation system 130, the bracket 185 can also be operatively connected to oscillation system 130 such that the relative position of pole 135 with respect to the torch head 120 is constant. Thus, the mechanical steering device 180 can position the torch head 120/magnetic oscillation system 130 in the weld groove such that they are in the proper position for the magnetic arc oscillation system 130 to produce the desired weld weave pattern. In some embodiments, a mechanical steering device can be used to oscillate the torch head 120 (and arc 110) similar to the magnetic arc oscillation system 130 to produce weld weave patterns, e.g., as discussed above.

The system 100 can also include a ground switching circuit 195 that can switch between at least two grounds on the workpieces 115A and 115B (see FIG. 1B). The ground switching circuit 195 is operatively connected to grounds 196A and 196B such that only one ground is active at any given time. The grounds 196A and 196B are respectively located on workpieces 115A and 115B. The ground switching circuit 195 can be configured to switch the active ground in order to control or direct the direction of the arc 110. For example, in some embodiments, the ground switching circuit 195 is controlled such that it produces a sweeping action on arc 110 to produce a desired weld weave pattern. In some embodiments, an H-bridge circuit can be used to switch the active ground. General H-bridge circuits are well known in the art and will not be further discussed. The above illustrative embodiments show one ground on each workpiece. However, any number of strategically placed grounds on each workpiece can be used to produce the desired weld weave pattern.

Figure 6:
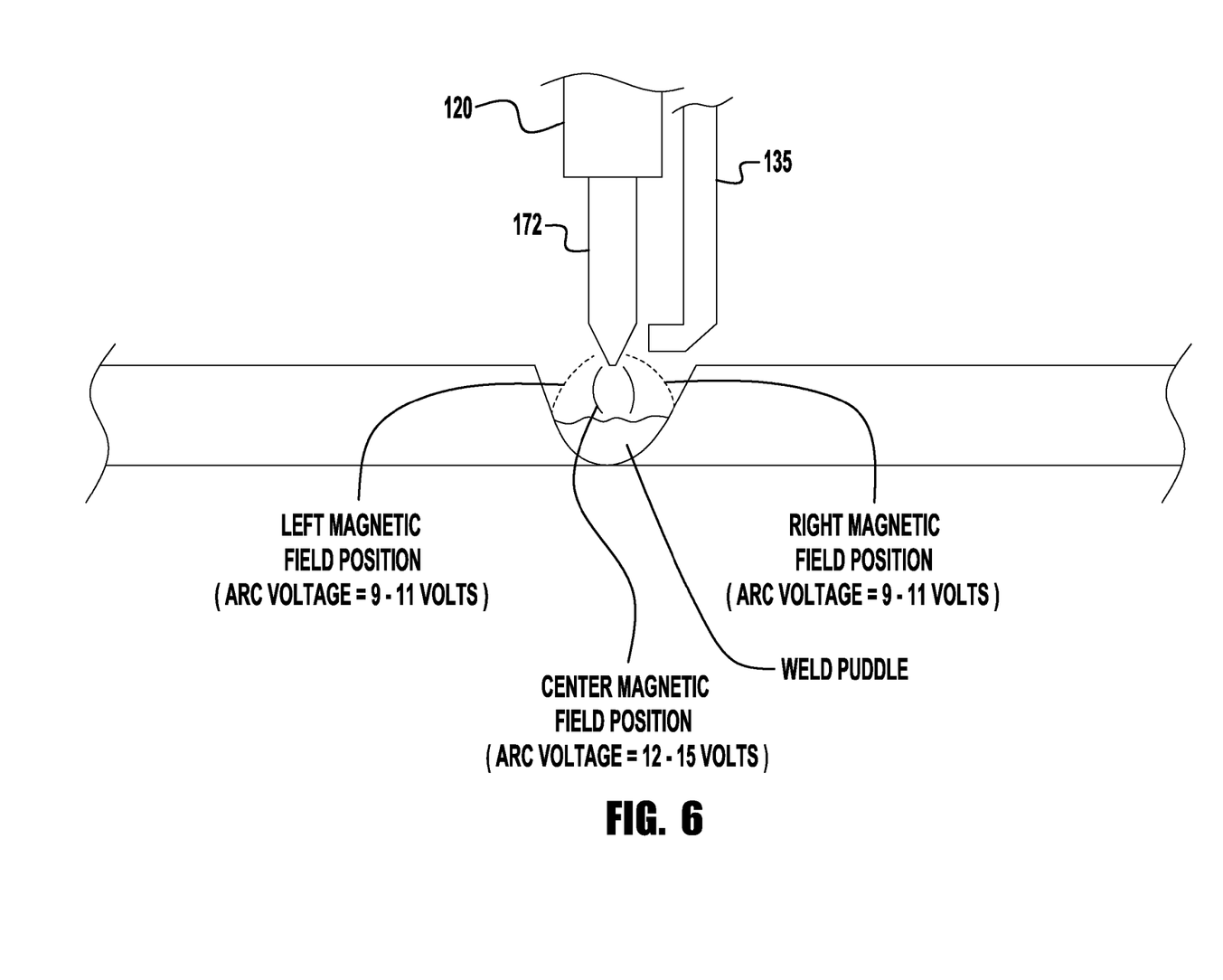
FIG. 6 illustrates exemplary arc voltage values at various points of an arc sweep in an exemplary weld joint.

One or more of power supply 170, power supply 175, magnetic oscillation system 130, mechanical steering device 180, wire feeder 150, and ground switching circuit 195 can be connected to sensing and control unit 190. In some embodiments, the control unit 190 includes control logic that, based on the welding conditions, automatically steers the torch head 120 in the weld joint via mechanical steering device 180. The control unit 190 may also accept feedback signals from voltage and current sensors that measure the voltage (V) at contact tube 160 and the current (I) flowing to the system in order to determine the proximity of the arc 110 and/or torch head 120 to the sidewalls of the weld groove. Of course, in some embodiments, other feedback signals can be used such as a power output of the power supply 170, contact tip to weld distance (CTWD), etc. so long as the feedback can provide an indication of the position of the arc 110 and/or the torch head 120 relative to the side walls. The feedback signals can then be used to automatically steer the torch head 120 and/or arc 110. For example, based on the welding operation (e.g., GTAW, GMAW, PAW, etc.), the type of materials, the number of weld passes (single-pass/multi-pass welding), etc., the control unit 190 (or some other similar device) may be configured with desired arc voltage and/or current values for the arc 110 for one or more positions of the arc 110 along the arc sweep. For example, FIG. 6 illustrates an embodiment where the arc 110 is configured to sweep from one sidewall to the other. The magnetic arc oscillation system is configured to provide a left magnetic field via magnetic pole 135 that deflects the arc 110 to the base of the left sidewall and a right magnetic field that deflects the arc 110 to the base of the right sidewall. When the magnetic field is turned off, the arc 110 will be in a center position under the torch head 120. Of course, the magnetic arc oscillation system can be positioned differently based on the welding needs. For example, the torch head 120 can be set up such that it is over one of the sidewalls rather than in the middle. In such a case, the magnetic arc oscillation system will move the arc 110 from one sidewall (magnetic field off) to the other sidewall (magnetic field on). In other embodiments, the intensity of the magnetic field can be changed continuously to direct the arc 110 to any position in the weld groove rather than just discrete values, e.g., left sidewall, right sidewall, center, etc.

For the embodiment in FIG. 6, the arc 110 can have different desired arc voltages based on whether the arc 110 is away from the sidewalls (e.g., in the center magnetic field position), at the right sidewall, or at the left sidewall. That is, in exemplary embodiments of the present invention, the desired or threshold voltage levels for any given moment or position in the welding operation will vary by taking into account different factors, including but not limited to: electrode positioning, groove geometry, etc. For example, in the center magnetic field position, the desired arc voltage feedback can be, e.g., 12-15 volts and in the left and right sidewalls (i.e., left and right magnetic field positions), the desired arc voltage can be, e.g., 9-11 volts. Control of embodiments of the described system can occur in a number of different ways. For example, feedback from monitoring the arc voltage can be utilized at specific intervals during the welding operation, at specific locations during the welding process and/or can be continuous during the welding process (or any combination of these methodologies). For example, in some embodiments, the feedback signal, e.g. the arc voltage, can be monitored while or during the arc 110 is at a specific position along the arc sweep, e.g., when the arc 110 is positioned at the left, right, or center position by magnetic pole 135. In other embodiments, the feedback signal corresponding to arc 110 is monitored continuously, even during the transition from one arc position to another. In still other embodiments, the feedback signal is measured at a desired frequency, e.g., every N arc sweeps, or intermittently to verify proper operation. In further exemplary embodiments the feedback signal can be utilized after a duration, for example, every 5 to 20 ms. Of course, other durations and methodologies can be used without departing from the spirit or scope of the present invention.

Based on the feedback signal, e.g., the arc voltage, and information related to the arc position, e.g., left, right, or center position, the control unit 190 can determine if detected voltage is different from the desired voltage at any given position. For example, embodiments of the present invention can determine if the distance between the torch head 120 and the sidewalls has changed for some reason, e.g., the torch head 120 is drifting, misalignment in the side walls, etc. For example, if the control unit 190 sees that the arc 110 voltage is at 8 volts at the right magnetic field position, 12 volts at the center magnetic field position, and 12 volts at the left magnetic field position, the control unit 190 can determine that the torch head 120 is drifting to the right and that the torch head 120 needs to move to the left. Similarly, based on the feedback signal, the control unit 190 can be set up to determine if the arc sweep width needs to be adjusted because the width of the weld groove has changed for some reason, e.g., misalignment of the workpieces, deliberate design change in the weld groove width, etc. For example, if the control unit 190 sees that the arc 110 voltage is at 8 volts at the left and right magnetic field positions and 12 volts at the center magnetic field position, the control unit 190 can determine that the weld groove has narrowed and that the magnetic field strength or another weld setting needs to be adjusted to ensure proper welding with the narrowed groove walls.

In some embodiments, the system 100 can be set up such that the appropriate adjustments are made to the torch head 120 position and/or the magnetic field strength based on predetermined values for the feedback signal, e.g., the arc voltage. For example, in some systems, a low arc voltage, e.g., less than 9 volts, can indicate that the arc 110 is too close to a sidewall of the weld groove and that a potential short and/or loss of arc condition exists. Conversely, a high arc voltage, e.g., greater than 11 volts, can indicate the arc 110 is away from a sidewall of the weld groove. In such systems, the control unit 190 can be configured such that: 1) when the arc 110 is in the left or right magnetic field position and the arc voltage is below a predetermined low level, e.g., 9 volts, the control unit 190 determines that the torch head 120 is too close to the sidewall; and 2) when the arc 110 is in the left or right magnetic field position and the arc voltage is greater than a predetermined high level, e.g., 11 volts, the control unit 190 determines that the torch 120 at the corresponding left or right position is too far away from the sidewall. Thus, by comparing the predetermined low and high values to the feedback signal from one or more points on the arc sweep (e.g., arc voltages at the left, right, and center magnetic field positions), the control unit 190 can be configured to appropriately move the torch head 120 within the weld groove using the mechanical steering device 180 and/or change the width of the arc sweep using the magnetic arc oscillation system 130. That is, the control unit 190 can be configured to steer the torch 120 away from the sidewall if the arc voltage is below the predetermined low level, or if the feedback voltage is too high (e.g., 12-15 volts), the control unit 190 can steer the torch head 120 toward the sidewall. The control unit 190 will know which direction to steer the torch head 120 because it is in communication with magnetic arc oscillation system 130, which can provide the position of the arc 110, e.g., left, right, and center.

In some embodiments, the control unit 190 is operatively connected to the mechanical steering device 180 in order to steer the torch head 120. The control unit 190 may be preprogrammed with predetermined auto steering values that are based on the materials being welded, the thicknesses of the workpieces 115A and 115B, whether the process is GTAW, GMAW, PAW, etc., and/or whether the process is single-pass or multi-pass welding—to name just a few. Alternatively, or in addition to, the control unit 190 may use adaptive controls to determine or "fine-tune" the auto steering values during the welding process. In some embodiments, the auto steering values may be user settable or adjustable.

Figure 3:
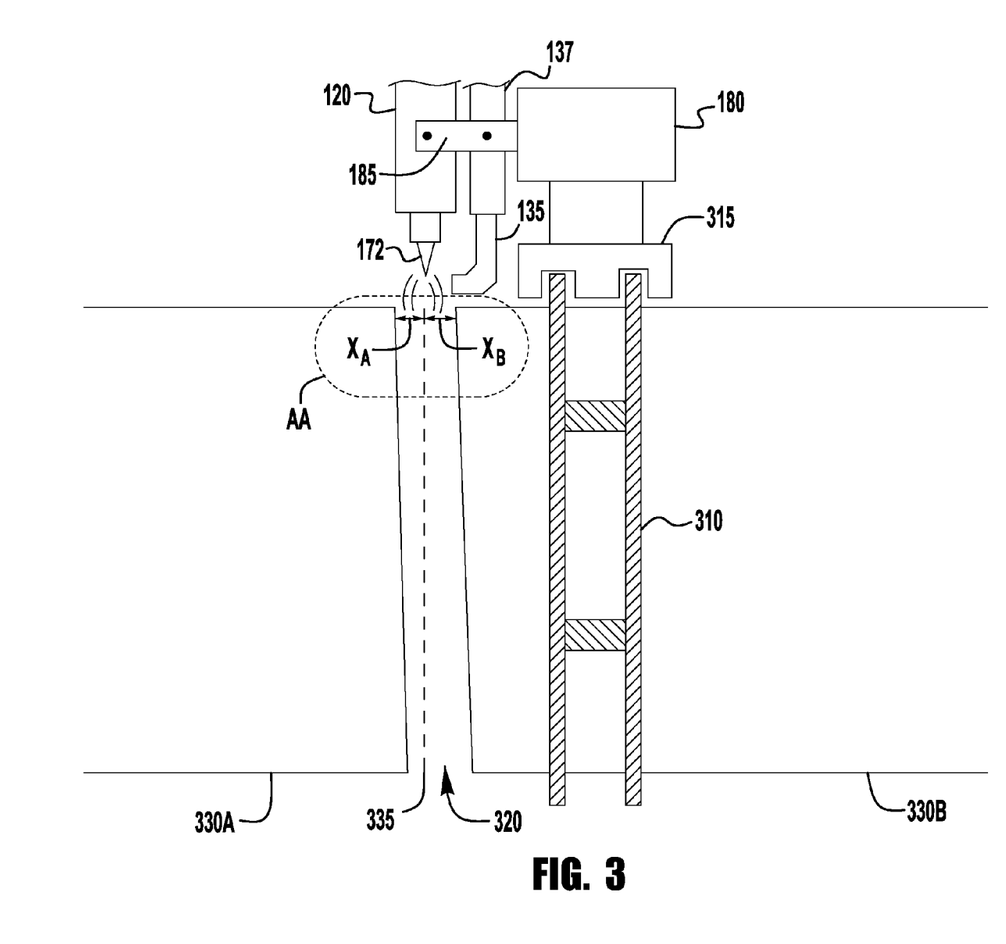
FIG. 3 illustrates a functional schematic block diagram of an exemplary embodiment of a system for any of brazing, cladding, building up, filling, hard-facing overlaying, joining, and welding applications on a pipe.

By measuring the voltage and/or current at the torch 120 and automatically steering the torch 120 as discussed above, the present invention automatically corrects for misalignment in workpieces that are to be welded. For example, FIG. 3 illustrates another exemplary embodiment of the present invention in which torch head 120 with electrode 172 and magnetic oscillator system 130 are mounted on weld head tractor unit 315, which moves along guide track 310 in an orbital welding system for welding pipe joint 320 that will connect pipe segments 330A and 330B. The components of an exemplary orbital welding system are discussed in co-pending application Ser. No. 13/675,168, which was filed on Nov. 13, 2012, and incorporated by reference herein in its entirety. Accordingly, for brevity, only those components of an orbital welding system relevant to explaining the present invention will be further discussed. The guide track 310 is set up around the entire circumference of pipe segment 330B such that the radial plane of guide track 310 is perpendicular to the longitudinal axis of the pipe segment 330B. As illustrated, the pipe joint 320 will take two passes to weld, i.e., weld passes $X_A$ and $X_B$ on either side of centerline 335.

Figure 4:
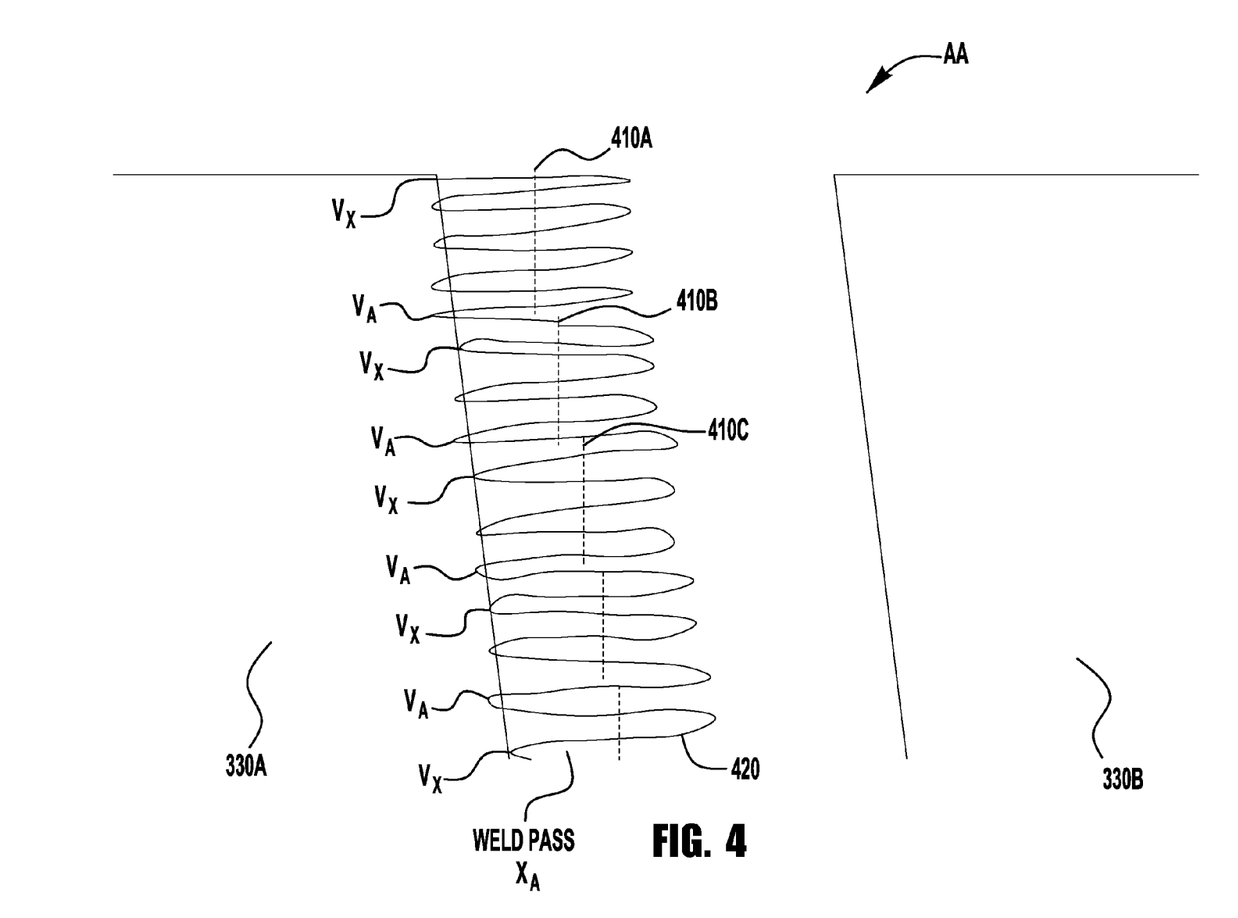
FIG. 4 illustrates an expanded view of section AA of FIG. 3.

To accomplish this, the mechanical steering device 180 can position the torch head 120 such that torch head 120 is at the mid-point of weld pass $X_A$. As illustrated in FIG. 4, which is an expansion of section AA of FIG. 3, the torch 120 is initially positioned at line 410A, which is at the mid-point of weld pass $X_A$. As the magnetic oscillator 180 and/or the ground switching circuit 195 sweeps the arc 110 from one side to the other to produce weld 420, the weld 420 will cover approximately one-half of the weld joint. However, as is sometimes the case, the weld joint may not be straight and true, i.e., the weld groove sidewalls may not be perpendicular to the longitudinal axis of the pipe segments 330A and 330B (see FIG. 4). Accordingly, as the weld tractor head 315 moves down the guide track 310 (see FIG. 3), the weld 420 may get too close to the sidewall. This may result in a poor quality weld and/or arc stability issues near the sidewall. In addition, the coverage of the second weld pass $X_B$ will be adversely affected because the first weld pass $X_A$ will not cover one-half of the weld joint 320 as expected. Thus, in traditional welding systems, an operator manually adjusted for any misalignment issues by re-centering the torch head 120.

However, as discussed above, the control unit 190 (or some other similar device) can receive and monitor feedback signals, e.g., arc voltage, in order to determine the position of arc 110 and/or torch head 120 with respect to the sidewall. For example, as discussed above, in some embodiments, control unit 190 can determine that torch head 120 is positioned properly based on a feedback signal corresponding to the arc 110, e.g., arc voltage. In the exemplary embodiment of FIG. 3, if the arc voltage at the left magnetic field position, i.e., left sidewall, is between 9-11 volts and between 12-15 volts for the center magnetic field position and the right magnetic field position, the control unit 190 will determine that the torch head 120 is positioned properly. Because this embodiment requires two weld passes, the right magnetic filed position on the first pass $X_A$ will position the arc 110 at the center line 335 of weld joint 320 rather than at the right sidewall. Thus, the desired arc voltage for the right magnetic field position in this embodiment is 12-15 volts rather than the 9-11 volts of the exemplary embodiment of FIG. 6.

If the control unit 190 determines that the feedback signal, e.g., arc voltage, is not within the desired range, then the control unit 190 can automatically move (i.e., steer) torch head 120 such that the torch head will maintain the proper distance from the groove wall. For example, if the voltage of arc 110 is below a predetermined value $V_A$, e.g., 9 volts, at the left magnetic field position, the control unit 190 can be configured to move torch head 120 to the right to point 410B using mechanical steering device 180 such that the arc 110 voltage at the left sidewall is at a desired value of $V_X$, e.g. between 9-11 volts. As the welding proceeds and the arc 110 once again gets too close to the left sidewall and the arc voltage goes below the predetermined voltage $V_A$, the control unit 190 can further move torch 120 to the right to point 410C such that the arc voltage is one again at $V_X$ and so on. In this manner, the control unit 190 will automatically adjust for misalignments in the weld joint 320.

In the above embodiment, the control unit 190 was configured for stepwise adjustments, i.e., the arc voltage fell to a value $V_A$ from the desired value of $V_X$ before an adjustment was made. However, the invention is not limited to such stepwise adjustments and the control unit 190 can also be configured to continuously adjust the position of torch head 120 such that the arc voltage is maintained at a desired voltage value. Of course, in some embodiments, the present invention can also use the arc current as the feedback value when adjusting torch head 120.

For example, in a constant voltage process, current is utilized as the feedback to determine CTWD. In the case of a constant voltage process, as the electrode gets closer to the wall the current feedback signal at the wall will decrease. Conversely, when the electrode gets further away from the wall the current feedback signal will increase. Of course, the present invention is not limited to using the arc current or the arc voltage as the feedback signal and can use other feedback signals that change based on the proximity of the torch head to the sidewall, e.g., a power output of the power supply, CTWD, etc.

Figure 5:
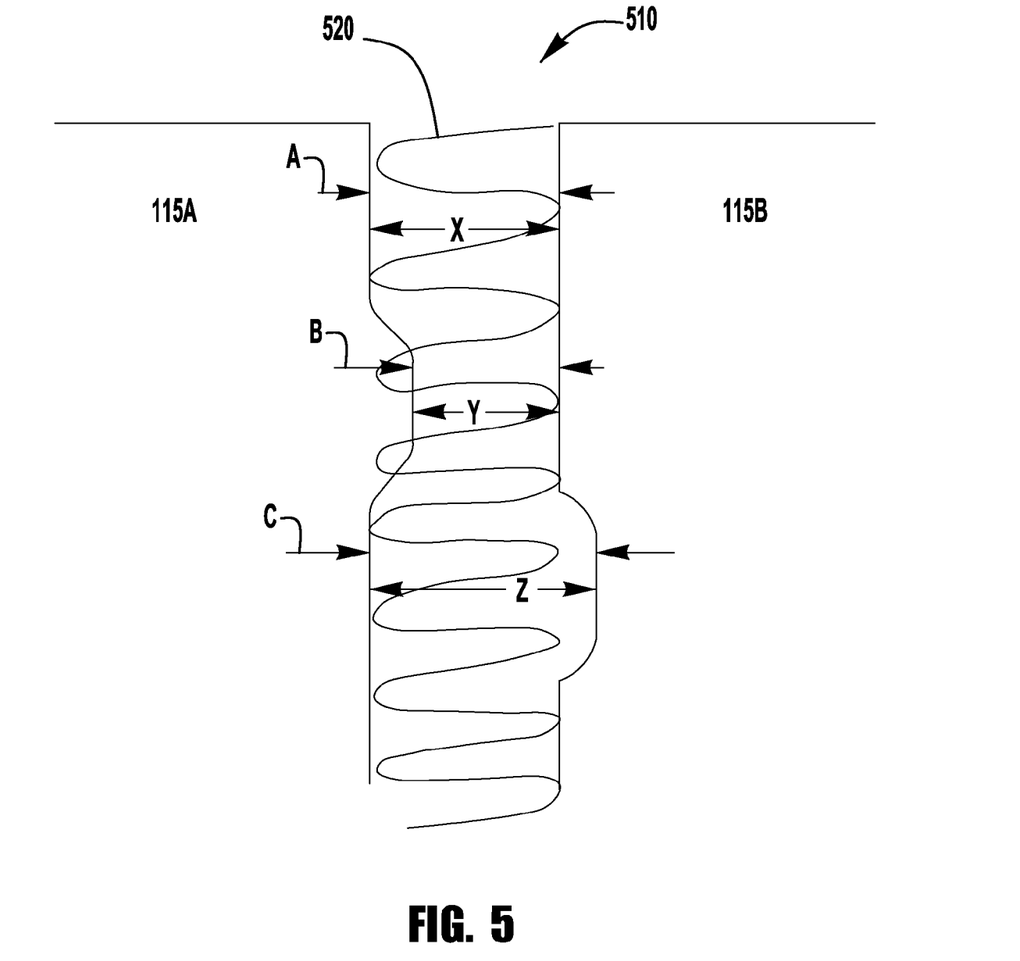
FIG. 5 illustrates an exemplary weld joint that can be welded using the system of FIG. 3.

In some situations, the width of the weld joint may vary due to, e.g., deviations in machining the weld groove. In such situations, the arc 110 and/or torch head 120 may move too close to or not close enough to a sidewall because the arc sweep no longer matches the expected width of the weld joint, i.e., the arc sweep may be too large or too small as the width of the weld joint changes. For example, as illustrated in FIG. 5, the system may be set up for the width of weld joint 510 at point A, which will produce weld 520. However, at point B, the width of weld joint 510 is smaller than at point A and the arc sweep will take the arc 110 and weld 520 too close to the left sidewall. Conversely, at point C the width of weld joint 510 is larger than at point A and the arc sweep will not take the arc 110 and weld 520 to the right sidewall. In addition, due to the change in the width, the torch head 120 may not be in the proper position, e.g., at the midpoint of the desired weld weave pattern. Accordingly, in prior art systems, an operator may need to manually adjust the width of the arc sweep and/or the location of the torch head to ensure a proper weld. However, in some embodiments of the present invention, the control unit 190 (or some other similar device) may adjust the position of torch head 120 using mechanical steering device 180 and/or the width of the arc sweep using the magnetic oscillation system 130 and/or the ground switching circuit 195. To accomplish this, the control unit 190 can use the voltage and/or current feedback signals from the torch head 120 to determine whether the arc sweep width is appropriate. For example, if the arc voltage is 9-11 volts at both the left and right magnetic field positions, the control unit 190 determines the arc sweep width is appropriate and that the width of the weld groove has not changed significantly. However, if the right and/or left magnetic field position has an arc voltage that is less than a predetermined value, e.g., 9 volts, the control unit 190 determines that the weld groove width has narrowed at the right and/or left side wall, respectively. Similarly, if the right and/or left magnetic field position has an arc voltage that is greater than a predetermined value, e.g., 11 volts, the control unit 190 determines that the weld groove width has widened at the right and/or left side wall, respectively. Accordingly, based on the feedback signal, e.g., arc voltage, the control unit 190 can determine if the width of the weld joint at any particular point has changed and appropriately adjust the location of torch head 120 using mechanical steering device 180 such that the torch 120 is located at the midpoint of the arc sweep at that point. In addition, the control unit 190 can adjust magnetic arc oscillation system 130 and/or ground switching circuit 195 to produce an appropriate arc sweep width. For example, as the welding progress from point A to point B in FIG. 5, the control unit 190 will sense that the width of weld groove has changed from width X at point A to width Y. That is, the control unit 190 will sense that the arc voltage at the left magnetic field position is below a predetermined value, e.g., 9 volts, indicating that the arc 110 is too close to the sidewall, and that the arc voltage at the right magnetic field position is in the proper range, e.g., 9-11 volts. Because the arc voltage at the right magnetic field position has not changed from that measured at point A, the control unit 190 will determine that the weld groove has narrowed due to the left sidewall and make the appropriate adjustments to the width of the arc sweep and/or the position of the torch head 120. As the welding process progresses and the torch head 120 reaches point C, the control unit 190 determines that the arc 110 is too far away from the right sidewall because the arc voltage at the right magnetic field position is greater than a predetermined value, e.g., 11 volts, and thus not in the proper range of e.g., 9-11 volts. The control unit 190 can then appropriately adjust the position of torch head 120 and/or the width of the arc sweep for width Z at point C. In some embodiments, the control unit 190 may use a mechanical steering device to oscillate the torch head 120 in addition to or as an alternative to magnetic arc oscillation system 180 and/or ground switching circuit 195. To ensure that the deposition rate is still proper after a change in width, the travel speed of the torch head 120 and/or the feed rate of wire 140 can be appropriately adjusted by control unit 190 (or some other device).

In some embodiments of the present invention, the control unit 190 (or some other device) may be configured with lookup tables that include the desired feedback values of arc 110 at one or more points along the arc sweep. The desired values can depend on the type of welding process (e.g., GTAW, GMAW, PAW, etc.), the types and/or thicknesses of the materials being welded, the number of weld passes, etc. In some embodiments, the control unit 190 (or some other device) may include equations or other representations of feedback curves that provide the desired feedback values for arc 110 at one or more points along the arc sweep.

While the invention has been described with reference to certain embodiments, it will be understood by those skilled in the art that various changes may be made and equivalents may be substituted without departing from the scope of the invention. In the above embodiments, the control logic to steer torch head 120 was located in control unit 190. However, the control logic may be located in mechanical steering device 180 or in some other device. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

I claim:

1. An arc welding system with automated arc steering, said arc welding system comprising:
    a torch power supply that is operatively connected to a torch head that creates an arc in a weld groove formed in at least one workpiece;
    a control unit configured to:
        monitor, via at least one sensor, at least one of a voltage of said arc, a current of said arc, a power output of said torch power supply, and a contact tip to weld distance, and output a feedback signal corresponding to said monitoring via said at least one sensor,
        compare said feedback signal with at least one predetermined value corresponding to a position of at least one of said arc and said torch head in said weld groove, and
        output a steering signal based on said comparison; and
    a magnetic arc oscillation system configured to generate a magnetic field that sweeps said arc in a direction that is traverse to a travel direction of said torch head,
    wherein said steering signal is used to control said position of at least one of said arc and said torch head in said weld groove, and
    wherein said magnetic arc oscillation system includes a ground switching circuit configured to control a sweep width of said arc based on said steering signal.

2. The system of claim 1, further comprising a mechanical steering device that is operatively connected to said welding torch and positions said welding torch in said weld groove based on said steering signal,
    wherein said at least one predetermined value comprises a first predetermined value and a second predetermined value that correspond to a desired position of said arc or said torch head near a sidewall of said weld groove,
    wherein said mechanical steering device positions said torch head farther away from said sidewall when said comparison determines that said feedback signal is below said first predetermined value, and
    wherein said mechanical steering device moves said torch head closer to said sidewall when said comparison determines that said feedback signal is above said second predetermined value.

3. The system of claim 2, wherein said feedback signal is based on said voltage of said arc and said first predetermined value is 9 volts and said second predetermined value is 11 volts.

4. An arc welding system with automated arc steering, said arc welding system comprising:
    a torch power supply that is operatively connected to a torch head that creates an arc in a weld groove formed in at least one workpiece;
    a control unit configured to:
        monitor, via at least one sensor, at least one of a voltage of said arc, a current of said arc, a power output of said torch power supply, and a contact tip to weld distance, and output a feedback signal corresponding to said monitoring via said at least one sensor,
        compare said feedback signal with at least one predetermined value corresponding to a position of at least one of said arc and said torch head in said weld groove, and
        output a steering signal based on said comparison; and
    an arc oscillation system configured to sweep said arc in a direction that is traverse to a travel direction of said torch head, said arc oscillation system configured to control a sweep width of said arc in said weld groove based on said steering signal,
    wherein said steering signal is used to control said position of at least one of said arc and said torch head in said weld groove,
    wherein said at least one predetermined value comprises a first predetermined value and a second predetermined value that correspond to a desired position of said arc when said sweep positions said arc near a sidewall of said weld groove,
    wherein said arc oscillation system decreases said sweep width of said arc so that said arc is farther away from said sidewall when said comparison determines that said feedback signal is below said first predetermined value, and
    wherein said arc oscillation system increases said sweep width of said arc so that said arc is closer to said sidewall when said comparison determines that said feedback signal is above said second predetermined value.

5. The system of claim 4, further comprising:
a wire feeder that feeds a consumable to said arc for deposition into said weld groove; and
a drive unit operatively attached to said torch head or said at least one workpiece and configured to move said torch head relative to said at least one workpiece in a travel direction along said weld groove,
wherein at least one of a feed speed of said consumable and a travel speed of said torch head relative to said at least one workpiece is adjusted based on said increase or said decrease in said sweep width.

6. An arc welding system with automated arc steering, said arc welding system comprising:
a torch power supply that is operatively connected to a torch head that creates an arc in a weld groove formed in at least one workpiece;
a control unit configure to:
monitor, via at least one sensor, at least one of a voltage of said arc, a current of said arc, a power output of said torch power supply, and a contact tip to weld distance, and output a feedback signal corresponding to said monitoring via said at least one sensor,
compare said feedback signal with at least one predetermined value corresponding to a position of at least one of said arc and said torch head in said weld groove, and
output a steering signal based on said comparison; and
a magnetic arc oscillation system that sweeps said arc in a direction that is traverse to a travel direction of said torch head, said magnetic arc oscillation system controlling a sweep width of said arc in said weld groove based on said steering signal,
wherein said steering signal is used to control said position of at least one of said arc and said torch head in said weld groove,
wherein said at least one predetermined value comprises a first predetermined value and a second predetermined value that correspond to a desired position of said arc when said sweep positions said arc near a sidewall of said weld groove,
wherein said magnetic arc oscillation system decreases said sweep width of said arc so that said arc is farther away from said sidewall when said comparison determines that said feedback signal is below said first predetermined value,
wherein said magnetic arc oscillation system increases said sweep width of said arc so that said arc is closer to said sidewall when said comparison determines that said feedback signal is above said second predetermined value, and
wherein said magnetic arc oscillation system is configured to generate a magnetic field to control said sweep width of said arc.

7. An arc welding system with automated arc steering, said arc welding system comprising:
a torch power supply that is operatively connected to a torch head that creates an arc in a weld groove formed in at least one workpiece;
a control unit configured to:
monitor, via at least one sensor, at least one of a voltage of said arc, a current of said arc, a power output of said torch power supply, and a contact tip to weld distance, and output a feedback signal corresponding to said monitoring via said at least one sensor,
compare said feedback signal with at least one predetermined value corresponding to a position of at least one of said arc and said torch head in said weld groove, and
output a steering signal based on said comparison; and
an arc oscillation system that sweeps said arc in a direction that is traverse to a travel direction of said torch head, said arc oscillation system controlling a sweep width of said arc in said weld groove based on said steering signal,
wherein said steering signal is used to control said position of at least one of said arc and said torch head in said weld groove,
wherein said at least one predetermined value comprises a first predetermined value and a second predetermined value that correspond to a desired position of said arc when said sweep positions said arc near a sidewall of said weld groove,
wherein said arc oscillation system decreases said sweep width of said arc so that said arc is farther away from said sidewall when said comparison determines that said feedback signal is below said first predetermined value,
wherein said arc oscillation system increases said sweep width of said arc so that said arc is closer to said sidewall when said comparison determines that said feedback signal is above said second predetermined value, and
wherein said arc oscillation system comprises a ground switching circuit that controls said sweep width of said arc.

8. The system of claim 4, wherein said feedback signal is based on said voltage of said arc, and said first predetermined value is 9 volts and said second predetermined value is 11 volts.

9. An arc welding system with automated arc steering, said arc welding system comprising:
a torch power supply that is operatively connected to a torch head that creates an arc in a weld groove formed in at least one workpiece;
a control unit configured to:
monitor, via at least one sensor, at least one of a voltage of said arc, a current of said arc, a power output of said torch power supply, and a contact tip to weld distance, and output a feedback signal corresponding to said monitoring via said at least one sensor,
compare said feedback signal with at least one predetermined value corresponding to a position of at least one of said arc and said torch head in said weld groove, and
output a steering signal based on said comparison;
a magnetic arc oscillation system that generates a magnetic field that sweeps said arc in a direction that is traverse to a travel direction of said torch head; and
a mechanical steering device that is operatively connected to said welding torch,
wherein said steering signal is used to control said position of at least one of said arc and said torch head in said weld groove, and
wherein at least one of a sweep width of said arc and said position of said welding torch in said weld groove is controlled based on said steering signal.

10. The system of claim 9, wherein said at least one predetermined value comprises, a first predetermined value corresponding to a desired first position of said arc near a first sidewall of said weld groove, a second predetermined value corresponding to a desired second position of said arc near a second sidewall of said weld groove, and a third predetermined value corresponding to a desired third position of said arc that is between said first position and said second position, and wherein said arc steering system determines whether to control said sweep width of said arc, said position of said torch head, or both said sweep width and said torch head position based on comparisons of said feedback signal with at least one of said first predetermined value, said second predetermined value, and said third predetermined value.

11. The system of claim 4, wherein said arc oscillation system includes a mechanical steering device.

* * * * *